(12) United States Patent
Tanger et al.

(10) Patent No.: US 9,642,480 B1
(45) Date of Patent: May 9, 2017

(54) APPARATUS FOR SUSPENDING OBJECT ON A WALL

(71) Applicants: Jonathan P Tanger, Plantation, FL (US); Davina C Lochan, Plantation, FL (US)

(72) Inventors: Jonathan P Tanger, Plantation, FL (US); Davina C Lochan, Plantation, FL (US)

( * ) Notice: Subject to any disclaimer, the term of this patent is extended or adjusted under 35 U.S.C. 154(b) by 0 days.

(21) Appl. No.: 14/981,735

(22) Filed: Dec. 28, 2015

(51) Int. Cl.
*F16B 1/00* (2006.01)
*A47G 1/17* (2006.01)
*A47G 1/16* (2006.01)

(52) U.S. Cl.
CPC ............. *A47G 1/17* (2013.01); *A47G 1/1606* (2013.01); *F16B 1/00* (2013.01)

(58) Field of Classification Search
USPC .......................... 248/683, 467, 309.4, 206.5
See application file for complete search history.

(56) References Cited

U.S. PATENT DOCUMENTS

| | | | | |
|---|---|---|---|---|
| 3,419,832 A | * | 12/1968 | Baermann | B25H 3/04 206/818 |
| 3,729,158 A | * | 4/1973 | Nagy | B44D 3/123 248/110 |
| 4,586,616 A | * | 5/1986 | Cooper | A47J 47/16 211/88.04 |
| 6,216,888 B1 | * | 4/2001 | Chien | B23Q 3/1546 211/70.6 |
| 6,719,155 B1 | * | 4/2004 | Chang | B25H 3/04 206/350 |
| 2002/0130231 A1 | * | 9/2002 | Winnard | B25H 3/04 248/206.5 |
| 2004/0084593 A1 | * | 5/2004 | Barfield | A47G 23/0225 248/311.2 |
| 2005/0045784 A1 | * | 3/2005 | Pitlor | H02G 3/20 248/206.5 |
| 2005/0156085 A1 | * | 7/2005 | Radovan | A46B 17/02 248/110 |
| 2011/0011994 A1 | * | 1/2011 | Ahlstrom | A47G 1/168 248/205.4 |

* cited by examiner

*Primary Examiner* — Alfred Wujciak
(74) *Attorney, Agent, or Firm* — Gulf Coast Intellectual Property Group

(57) ABSTRACT

An apparatus operable to provide hanging of an object on a vertical wall such as but not limited to an open back canvas. The apparatus includes a wall member and a frame member. The wall member includes a recessed portion having a raised perimeter edge circumferentially surrounded thereto. The frame member includes an upper surface operable to support an object thereon. A lip is formed along the rear perimeter edge of the upper surface. The frame member includes an upper portion having an angular perimeter edge. Contiguously formed with the upper portion is lower portion having a plurality of sides and a bottom. A pair of magnetic projections members are present on the rear side of the lower portion and the bottom of the lower portion. The magnetic projections members are configured to couple with the recessed portion of the wall member.

20 Claims, 3 Drawing Sheets

US 9,642,480 B1

APPARATUS FOR SUSPENDING OBJECT ON A WALL

FIELD OF THE INVENTION

The present invention relates generally to devices operable to hang an object on a wall, more specifically but not by way of limitation an apparatus configured to suspend an open back canvas or art board either with or without a frame wherein the apparatus of the present invention includes a wall member and a frame member and wherein the frame member includes at least one magnetic leg.

BACKGROUND

Millions of homeowners regularly decorate the interior of the rooms of their homes. Interior design is known to include numerous elements and some exemplary decorative elements are paintings and pictures. As is known in the art paintings and pictures are typically framed works of art with the former many times being applied to a canvas or similar item having an open back design. Regular use of conventional picture hangers is common and as is known in the art a conventional picture hanger includes a member secured to a wall that has a portion operable to receive therein a wire or other similar object that is mounted across the back of the picture or painting desired to be hung on the wall. Numerous other types of fasteners have been developed and are utilized to provide a technique for hanging an object on a wall.

One problem with existing magnetic hangers are dependent upon frictional shear forces to maintain an object in a desired position. When utilizing these existing magnetic hangers if the object is too heavy and has a poor magnetic bond or low coefficient of friction then the object coupled to these existing magnetic hangers will fall due to failure of the magnetic hanger. The present invention utilizes a wall member having a raised perimeter edge configured to inhibit shear forces wherein the wall member utilizes improved magnetic torsion forces to assist in securing an object to a wall.

Accordingly, there is a need for a hanging apparatus that is operable to hang an object on a wall that includes a frame portion and a wall portion wherein the hanging apparatus is operable to provide secure engagement with the object being hung and further provide a technique that requires no mechanical fastener intermediate the frame portion and wall portion.

SUMMARY OF THE INVENTION

It is the object of the present invention to provide an apparatus operable to hang an object on a wall wherein the apparatus includes a frame member operable to be coupled to the object and a wall member operable to be secured to a wall wherein the frame member and wall member are configured to be operably coupled using magnetic forces.

Another object of the present invention is to provide an apparatus operable to hang an object on a wall wherein the frame member includes body having an upper surface that is operable to facilitate a parallel coupling of the frame member to the rear of a conventional frame.

A further object of the present invention is to provide an apparatus for hanging an object on a wall wherein the apparatus utilizes magnetic forces and wherein the frame member further includes an alignment lip extending upward from the upper surface wherein the alignment lip is operable to engage a portion of a frame and promote alignment therewith.

An additional object of the present invention is to provide an apparatus for hanging an object on a wall such as but not limited to a open back canvas wherein the body of the frame member includes an angular portion wherein the angular portion further includes a plurality of apertures operable to receive fasteners therethrough so as to engage a portion of the frame of the open back canvas.

Still another object of the present invention is to provide an apparatus for hanging an object on a wall without the requirement for a mechanical fastener between the wall member and the frame member of the apparatus wherein the frame member further includes at least one magnetic leg member extending outward therefrom.

Yet another object of the present invention is to provide an apparatus for hanging an object on a wall wherein the wall member is generally square in shape and includes a recessed central portion being surrounded by a raised perimeter edge.

An additional object of the present invention is to provide an apparatus for hanging an object on a wall having a mateable frame member and a wall member wherein the wall member further includes at least one aperture configured to receive a fastener therethrough to facilitate the securing of the wall member to a wall.

An added object of the present invention is to provide an apparatus for hanging an object on a wall wherein frame member further includes at least one magnetic leg member extending downward therefrom.

An additional object of the present invention is to provide an apparatus for hanging an object on a wall wherein the wall member is provided in at least two alternative embodiments.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figures 1, 2:
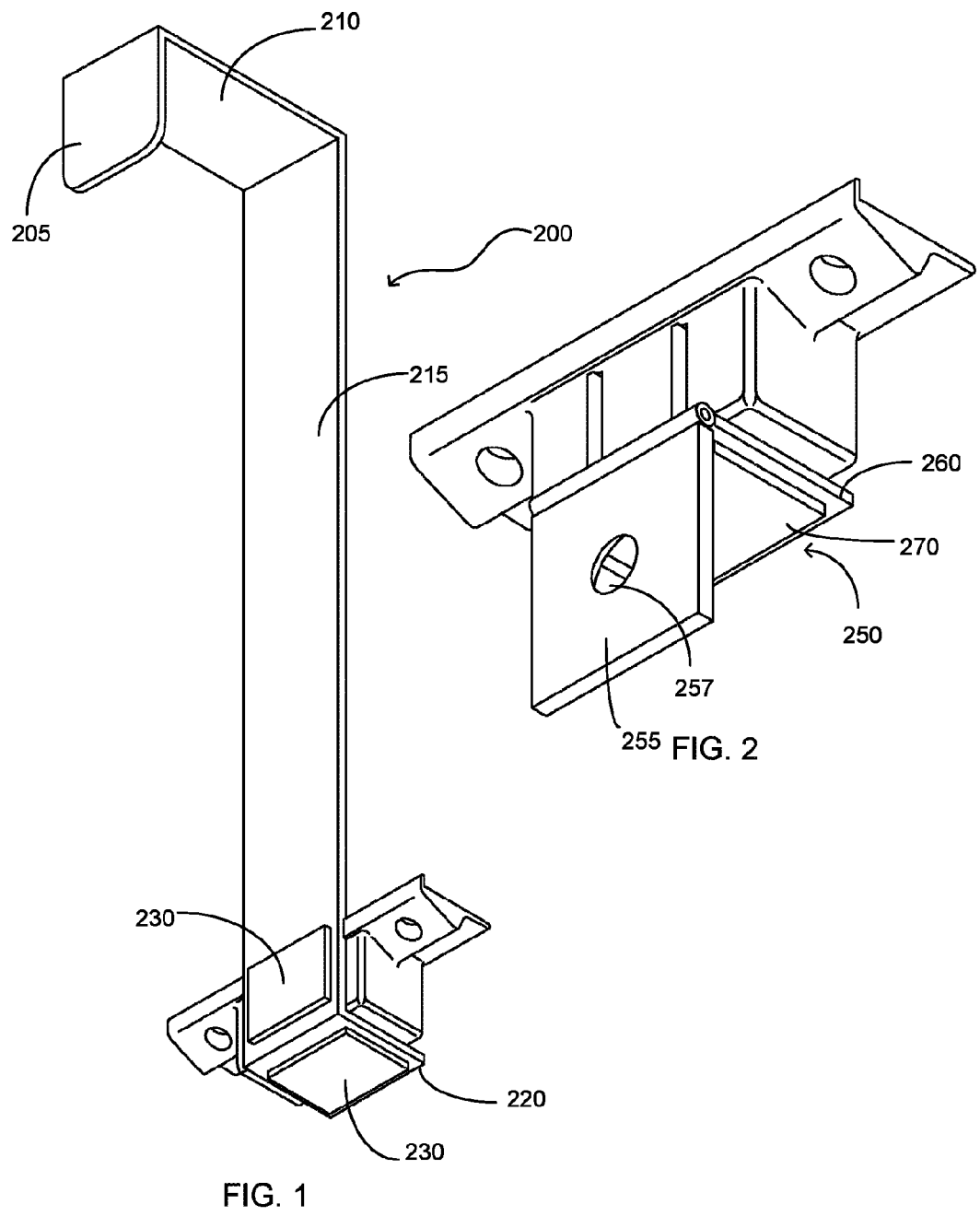
FIG. 1 is a lower perspective view of an alternative embodiment of the wall member engaged with the frame member of the present invention.
FIG. 2 is a lower perspective view of an alternative embodiment of the wall member of the present invention engaged with the frame member.

Referring now to the drawings submitted herewith, wherein various elements depicted therein are not necessarily drawn to scale and wherein through the views and figures like elements are referenced with identical reference numerals, there is illustrated hanging apparatus 100 constructed according to the principles of the present invention.

Figure 3:
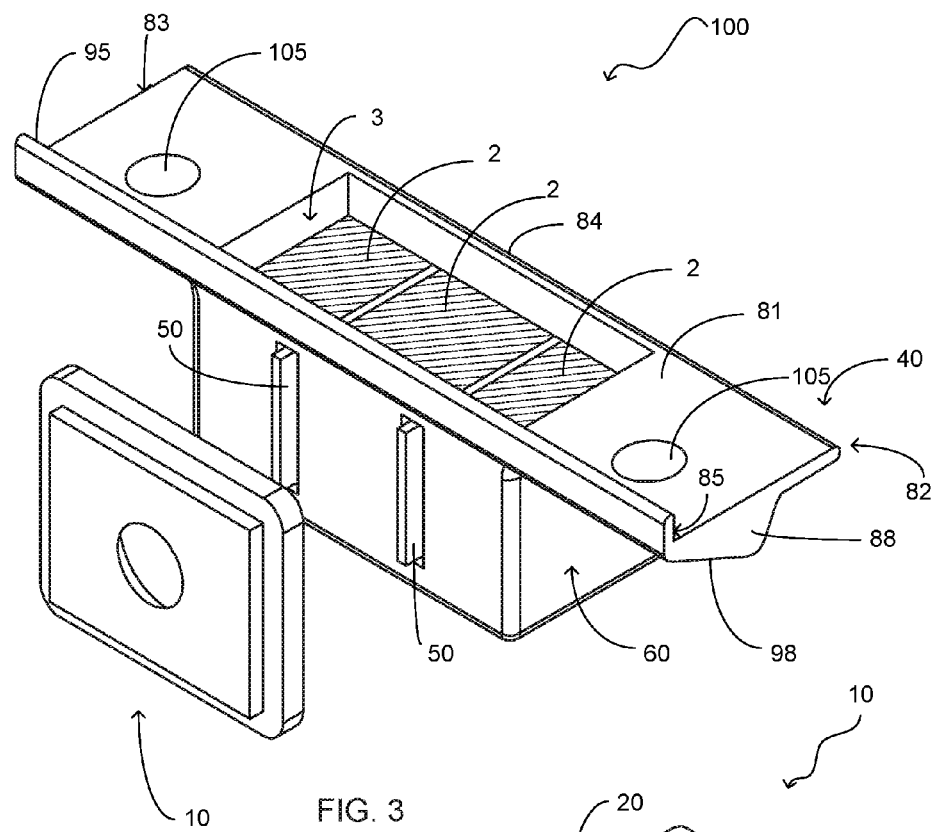
FIG. 3 is a perspective view of the wall member and the frame member of the present invention.
Figure 4:
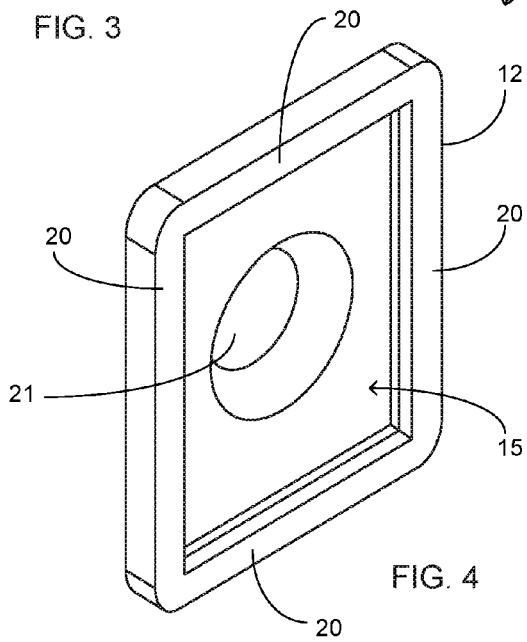
FIG. 4 is a detailed view of the wall member of the present invention.

Referring particular to FIG. 3 and FIG. 4 herein, the hanging apparatus 100 includes wall member 10. Wall member 10 is manufactured from a suitable durable material such as but not limited to a ferromagnetic metal. The wall member 10 is operable to be secured to a wall such as but not limited to the interior surface of a wall within a home. The wall member 10 includes body 12 that is square in shape and includes a recessed portion 15. A raised perimeter edge 20 is circumferentially secured to the body 12 adjacent to the recessed portion 15. The body 12 is formed utilizing suitable techniques that provide an integral formation of the recessed portion 15 and raised perimeter edge 20. As is further discussed herein, the raised perimeter edge 20 functions to engage the ferromagnetic projection member 50 so as to substantially inhibit the movement thereof during suspension of an object on a wall. The wall member 10 includes aperture 21 bored centrally therethrough. The aperture 21 is configured to receive a fastener such as but not limited to a screw therethrough so as to facilitate the securing of the wall member 10 to a wall. While one aperture 21 is illustrated herein, it is contemplated within the scope of the present invention that more than one aperture 21 could be journaled through the body 12.

The body 12, specifically the recessed portion 15, is manufactured from a ferromagnetic material having properties such that the projection members 50 will facilitate a magnetic coupling thereof. The magnetic properties of the recessed portion 15 and the projection members 50 are configured to provide a quick and efficient technique of coupling the wall member 10 and the frame member 40 subsequent the frame member 40 being secured to an object to be suspended on a wall such as but not limited to an open back framed canvas. The raised perimeter edge 20 of the body 12 functions to decrease the shear forces acting between the wall member and the frame member 40 as the projection members 50 extend into the recessed portion 15 created by the raised perimeter edge 20. More specifically, the ends 51 of the projection member 50 are adjacent the raised perimeter edge 20 subsequent engagement of the wall member 10 and frame member 40 and wherein the aforementioned placement provides a physical engagement between the wall member 10 and the projection members 50 wherein the physical engagement thereof reduces the shear forces therebetween.

Figure 5:
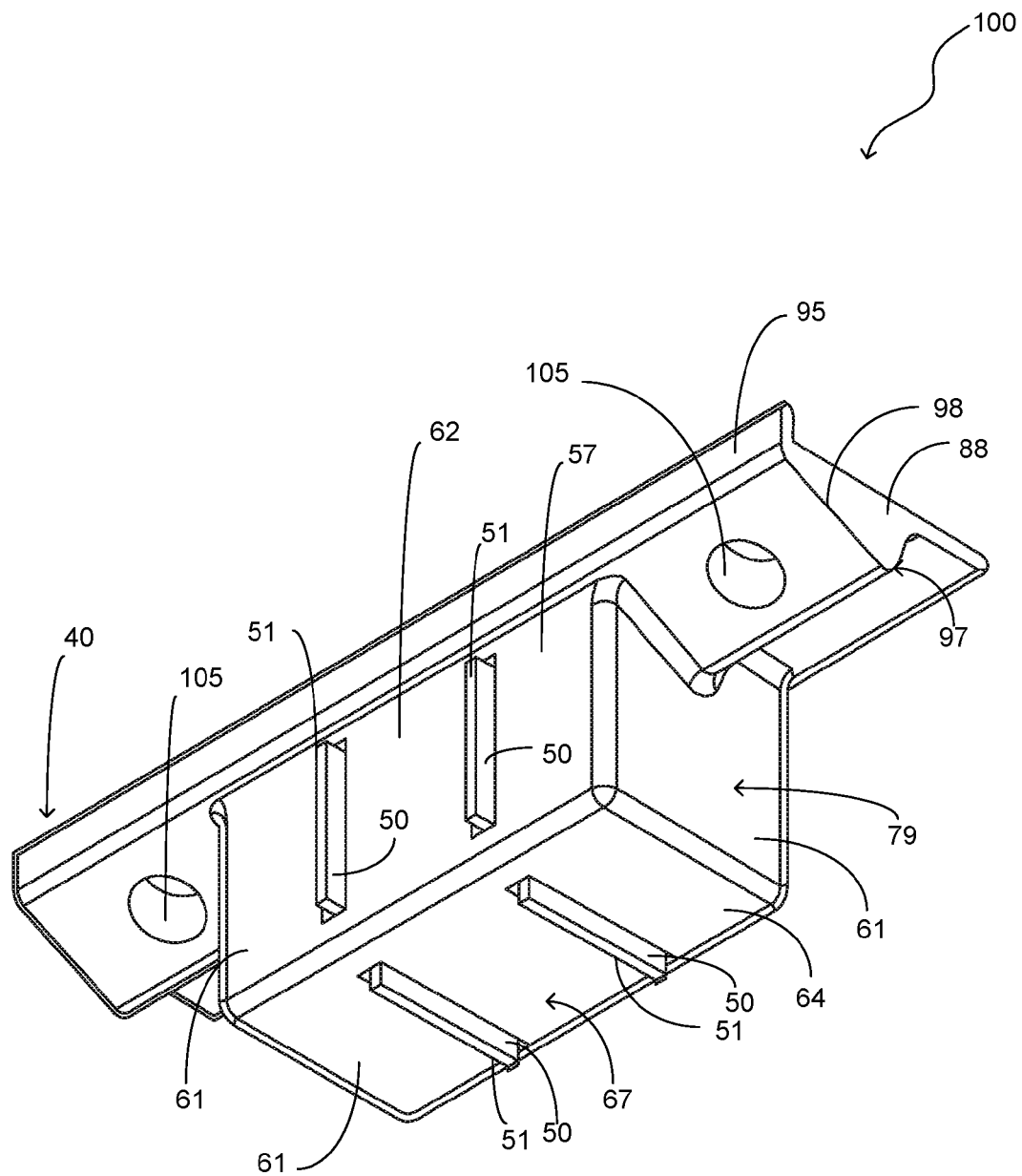
FIG. 5 is a lower perspective view of the frame member of the present invention.

Referring now to FIG. 1, FIG. 3 and FIG. 5 herein, the hanging apparatus 100 further includes frame member 40. Frame member 40 is configured to be releasably secured to an object desired to be hung on a wall. More specifically but not by way of limitation, the frame member 40 is operable to be secured to the frame portion of a conventional framed canvas. The frame member 40 includes body 79 having an upper surface 81. The upper surface 81 is planar in manner and functions to have superposed thereon a portion of the object desired to be hung on a wall. The upper surface 81 is rectangular in shape having a first end 82 and second end 83 and a forward perimeter edge 84. Opposite the forward perimeter edge 84 is rear perimeter edge 85. Integrally formed with the upper surface 81 proximate the rear perimeter edge 85 is lip 95. Lip 95 is perpendicular with upper surface 81 and extends upward therefrom. The lip 95 functions to ensure a mounting to the object that is square and parallel in manner. By way of example but not limitation, as the frame member 40 is engaged with a conventional open back canvas frame portion the upper surface 81 is placed adjacent to the bottom surface of the frame portion of the conventional open back canvas. Continuation of placement proceeds with the lip 95 being placed adjacent to the rear side of the frame of the conventional open back canvas. The aforementioned placement ensures a square and parallel securing of the frame member 40.

The frame member 40 includes upper portion 88 that is integrally formed with the upper surface 81 and lip 95. Upper portion 88 is underneath upper surface 81 and includes perimeter edge 98. Perimeter edge 98 extends from adjacent lip 95 to end 97. Upper portion 88 is angular in construction such that the thickness thereof proximate end 97 is greater than that of the thickness proximate lip 95. The aforementioned construction provides a perimeter edge 98 that is angular in orientation with respect to the upper surface 81. The angular orientation of the perimeter edge 98 is operable to ensure that the frame member 40 is secured to an article for hanging so as to substantially inhibit any vertical shear forces acting on fasteners journaled through apertures 105. Apertures 105 are bored through the upper portion 88 utilizing suitable techniques. The angular orientation of the perimeter edge 98 ensures that the lip 95 is pulled against the article to which the frame member 40 is being secured to during the process of tightening the fastener, by way of example a conventional screw. This ensures a square mounting of the frame member 40 to an object and further ensures that the frame member 40 will engage the wall member 10 such that the load distribution will extend the length of the frame member 40. The angular orientation of perimeter edge 98 further provides an improved access to a screw or other fastener being journaled through aperture 105 during fastening of the frame member 40 to an object. The angular orientation of the perimeter edge 98 directs the head of the screw or fastener journaled through aperture 105 away from an object thereby reducing the probability of a user's tool or hand contacting and potentially damaging the object.

The frame member 40 includes a lower portion 60 having wall members 61 integrally formed. The lower portion 60 includes rear wall 62 and bottom 64 that are integrally formed and perpendicular with respect to each other. Secure to the rear wall 62 are projection members 50. The projection members 50 are manufactured from a suitable ferromagnetic material and are mounted such the outer edge 51 is distal to the outer surface 57 of the rear wall 62. The projection members 50 are rectangular in shape and extend substantially the height of the rear wall 62. The projection members 50 are operable to engage the wall member 10, specifically the recessed portion 15 thereof. While two projection members 50 are illustrated herein, it is contemplated that the rear wall 62 could have different quantities of projection members 50. By way of example but not limitation, the rear wall 62 could have as few as one projection member 50 or more than two. The projection members 50 are magnetized by magnets 2 that are disposed within cavities 3 wherein the magnets 2 provide the projection members 50 the magnetic properties to couple with wall member 10.

Bottom 64 further includes two projection members 50 extending outward therefrom. The outer edge 51 is distal to the outer surface of the bottom 64. The projection members 50 secured to the bottom 64 are operable to engage an alternative embodiments of the wall member 200, 250 as further discussed herein, wherein a portion of the wall member 200,250 is positioned so as to engage the bottom 64 of the frame member 40. Similarly to the projections members 50 on the rear wall 62, it is contemplated within the scope of the present invention that the bottom 64 could utilize different quantities of projection members 50.

Hanging apparatus 100 further includes wall member 200. Wall member 200 is an alternative embodiment of wall member 10 and can be utilize to engage an object such as but not limited to a door. Wall member 200 includes first portion 205, second portion 210, third portion 215 and fourth portion 220 that are integrally formed being manufactured from a suitable durable material such as but not limited to metal. The first portion 205, second portion 210 and third portion 215 are formed to create the shape illustrated herein so as to suspend the wall member 200 over the top of a door or similar structure. The wall member 200 is manufactured having a thickness that does not interfere with the operation of a door to which the wall member 200 is engaged. Integrally formed with the third portion 215 and fourth portion 220 are recessed sections 230. The recessed sections 230 are similar to the recessed portion 15 and are operable to receive therein and magnetically couple to projection members 50. Wall member 200 is constructed in a manner so as to facilitate the simultaneous engagement of both the projection members 50 of the rear wall 62 and the projection members 50 of the bottom 64.

Illustrated herein in FIG. 2 is wall member 250. Wall member 250 is an alternative embodiment of wall member 10. Wall member 250 includes a first portion 255 and second portion 260. Wall member 250 is manufactured from a suitable durable material such as but not limited to metal. The first portion 255 and second portion 260 are formed so as to be perpendicular in orientation with respect to each other. An aperture 257 is present in first portion 255 and is operable to receive a fastener such as but not limited to a screw therethrough so as to secure the wall member 250 to a wall or similar structure. The second portion 260 of the wall member 250 includes recessed portion 270. Recessed portion 270 is formed similarly to recessed portion 15 and is operable to magnetically couple with projection members 50 present on the bottom 64 of frame member 40.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An apparatus operable to suspend an object on a wall comprising:
   a wall member, said wall member being manufactured from a rigid ferromagnetic material, said wall member being configured to be secured to a vertical support surface, said wall member having at least one recessed portion, said at least one recessed portion being surrounded by a raised perimeter edge;
   a frame member, said frame member configured to be operably coupled to an object desired to be suspended on a vertical wall, said frame member including an upper surface, said upper surface being planar in manner, said upper surface being rectangular in shape, said frame member further including a lip extending upward therefrom, said lip operable to promote square engagement with an object, said frame member further including an upper portion, said upper portion being underneath and contiguous with said upper surface, said upper portion having a perimeter edge that is angular in manner, said frame member further including a lower portion, said lower portion being integrally formed with said upper portion, said lower portion having a plurality of sides and bottom, said frame member having a plurality of cavities, said plurality of cavities having magnets disposed therein, said frame member including at least one projection member, said at least one projection member being adjacent said magnets, said at least one projection member extending outward through an opening from said lower portion; and
   wherein said at least one projection member is magnetic and configured to couple with said at least one recessed portion of said wall member.

2. The apparatus operable to suspend an object on a wall as recited in claim 1, wherein said at least one projection member includes a first end and a second end, said at least one projection member being rectangular in shape.

3. The apparatus operable to suspend an object on a wall as recited in claim 2, wherein said wall member further includes at least one aperture, said at least one aperture being journaled through said at least one recessed portion.

4. The apparatus operable to suspend an object on a wall as recited in claim 3, wherein said lower portion includes at least one projection member extending from the bottom thereof.

5. The apparatus operable to suspend an object on a wall as recited in claim 1, wherein said wall member further includes a first portion and a second portion, said first portion and said second portion being perpendicular in orientation, said second portion configured to engage with the lower portion of said frame member.

6. The apparatus operable to suspend an object on a wall as recited in claim 1, wherein said wall member further includes a plurality of portions, said plurality of portions being integrally formed so as to be hung on a door or similar object, said plurality of portions being planar in manner.

7. The apparatus operable to suspend an object on a wall as recited in claim 6, wherein said wall member includes a first recessed portion and a second recessed portion, said first recessed portion and said second recessed portion being formed in said wall member such that said second recessed portion is adjacent to the bottom of the lower portion.

8. An apparatus operable to suspend an object on a wall comprising:
   a wall member, said wall member being manufactured from a rigid ferromagnetic material, said wall member being configured to be secured to a vertical support surface, said wall member being square in shape, said wall member having a recessed portion;
   a frame member, said frame member configured to be operably coupled to an object desired to be suspended on a vertical wall, said frame member including an upper surface, said upper surface being planar in manner, said upper surface being rectangular in shape, said frame member further including a lip extending upward therefrom, said lip operable to promote square engagement with an object, said frame member further including an upper portion, said upper portion being underneath and contiguous with said upper surface, said upper portion having a perimeter edge that is angular in manner, said frame member further including a lower portion, said lower portion being integrally formed with said upper portion, said lower portion having a plurality of sides and bottom, said plurality of sides including a rear side, said lower portion having a plurality of cavities, said plurality of cavities having magnets disposed therein, said frame member including a first projection member, said first projection member having a portion being adjacent said magnets, said first projection member extending outward through an opening from said rear side, said rear side of said lower portion being configured to face a wall during utilization of the apparatus, said first projection member being rectangular in shape; and wherein said first projection member is configured to couple with said recessed portion of said wall member.

9. The apparatus operable to suspend an object on a wall as recited in claim 8, wherein said wall member further includes a raised perimeter edge, said raised perimeter edge circumferentially surrounding said recessed portion forming a boundary therearound.

10. The apparatus operable to suspend an object on a wall as recited in claim 9, and further including a second projection member, said second projection member extending outward from said rear side of said lower portion, said second projection member being parallel to said first projection member.

11. The apparatus operable to suspend an object on a wall as recited in claim 10, wherein first projection member and said second projection member have a length that is operable to engage said recessed portion within the boundary formed by said raised perimeter edge.

12. The apparatus operable to suspend an object on a wall as recited in claim 11, wherein said wall member further includes an aperture, said aperture being journaled through said recessed portion of said wall member.

13. The apparatus operable to suspend an object on a wall as recited in claim 8, wherein said lower portion of said frame member further includes at least one projection member extending downward from said bottom.

14. An apparatus operable to hang an object on a vertical support structure comprising:
a wall member, said wall member being manufactured from a rigid ferromagnetic material, said wall member being configured to be secured to a vertical support surface, said wall member said wall member having at least one recessed portion;
a frame member, said frame member configured to be operably coupled to an object desired to be suspended on a vertical wall, said frame member including an upper surface, said upper surface being planar in manner, said upper surface being rectangular in shape, said frame member further including a lip extending upward therefrom, said lip operable to promote square engagement with an object, said frame member further including an upper portion, said upper portion being underneath and contiguous with said upper surface, said upper portion having a perimeter edge that is angular in manner, said frame member further including a lower portion, said lower portion being integrally formed with said upper portion, said lower portion having a plurality of sides and bottom, said plurality of sides of said lower portion including a rear side, said lower portion having a plurality of cavities, said plurality of cavities having magnets disposed therein, said frame member including a first projection member, said first projection member having a portion adjacent to said magnets disposed within said plurality of cavities, said first projection member extending outward through an opening from said rear side, said rear side of said lower portion being configured to face a wall during utilization of the apparatus, said rear side having an outer surface, said lower portion further including a second projection member, said second projection member having a portion thereof disposed within said cavity adjacent to said magnets, said second projection member extending outward through an opening from said rear side, said first projection member and said second projection being rectangular in shape; and wherein said at first projection member and said second projection member being magnetic and configured to couple with said at least one recessed portion of said wall member.

15. The apparatus operable to hang an object on a vertical support structure as recited in claim 14, and further including a raised perimeter edge, said raised perimeter edge circumferentially surrounding said at least one recessed portion.

16. The apparatus operable to hang an object on a vertical support structure as recited in claim 15, wherein said first projection and said second projection member are parallel in configuration.

17. The apparatus operable to hang an object on a vertical support structure as recited in claim 16, wherein said bottom of said lower portion of said frame member further includes a first projection member and a second projection member, said first projection member and said second projection member of said bottom of said lower portion of said frame member extending downward therefrom and being parallel in configuration.

18. The apparatus operable to hang an object on a vertical support structure as recited in claim 17, wherein said first projection member and said second projection member are manufactured of a length that is approximately equivalent to the width of the at least one recessed portion.

19. The apparatus operable to hang an object on a vertical support structure as recited in claim 14, wherein said wall member further includes a plurality of sections, said plurality of sections being integrally formed so as to be hung on a door or similar object, said plurality of sections being planar in manner, wherein two of said plurality of sections include recessed portions configured to engage the first projection member and second projection member extending from said rear side of said lower portion of said frame member and further coupling with said first projection member and said second projection member of said bottom of said lower portion of said frame member.

20. The apparatus operable to hang an object on a vertical support structure as recited in claim 14, wherein said wall member further includes a first section and a second section, said first section and said second section being perpendicular in orientation, said second section having a recessed portion configured to engage with the first projection member and second projection member of said bottom of said lower portion of said frame member.

* * * * *